United States Patent [19]
Juang et al.

[11] Patent Number: 5,812,972
[45] Date of Patent: Sep. 22, 1998

[54] ADAPTIVE DECISION DIRECTED SPEECH RECOGNITION BIAS EQUALIZATION METHOD AND APPARATUS

[75] Inventors: Biing-Hwang Juang, Warren, N.J.; David Mansour, Haifa, Israel; Jay Gordon Wilpon, Warren, N.J.

[73] Assignee: Lucent Technologies Inc., Murray Hill, N.J.

[21] Appl. No.: 366,657

[22] Filed: Dec. 30, 1994

[51] Int. Cl.$^6$ ........................................................ G10L 5/06
[52] U.S. Cl. ............................................. 704/234; 704/251
[58] Field of Search ............................... 395/2.42, 2.43, 395/2.6, 2.84; 381/43; 704/233, 234, 251, 275

[56] References Cited

U.S. PATENT DOCUMENTS

| | | | |
|---|---|---|---|
| 4,737,976 | 4/1988 | Borth et al. | 379/58 |
| 4,959,864 | 9/1990 | Van Nes et al. | 395/2.6 |
| 5,371,901 | 12/1994 | Reed et al. | 455/69 |
| 5,483,579 | 1/1996 | Stogel | 379/88 |
| 5,664,059 | 9/1997 | Zhao | 704/254 |

OTHER PUBLICATIONS

Edward A. Patrick, Fundamentals of Pattern Recognition, Prentice–Hall, Inc., pp. 77,128,133,381–382, 1972.
Lawrence Rabiner and Biing–Hwang Juang, Fundamentals of Speech Recognition, pp. 7,51,105–106,321–322,375,390, 489, 1993.
Yunxin Zhao, "An Acoustic–Phonetic–Based Speaker Adaptation Technique for Improving Speaker–Independent Continuous Speech Recognition", IEEE Transactions on Speech and Audio Processing, vol. 2, No. 3, pp. 380–394, Jul. 1994.
Yunxin Zhao, "A New Speaker Adaptation Technique Using Very Short Calibration Speech", Proc. IEEE 1993 International Conference on Acoustics, Speech, and Signal Processing (ICASSP 93), pp. II–562—II–565, Apr. 1993.

*Primary Examiner*—David R. Hudspeth
*Assistant Examiner*—Tālivaldis Ivars Šmits

[57] ABSTRACT

The present invention provides a speech recognizer that creates and updates the equalization vector as input speech is provided to the recognizer. The present invention includes a speech analyzer which transforms an input speech signal into a series of feature vectors or observation sequence. Each feature vector is then provided to a speech recognizer which modifies the feature vector by subtracting a previously determined equalization vector therefrom. The recognizer then performs segmentation and matches the modified feature vector to a stored model vector which is defined as the segmentation vector. The recognizer then, from time to time, determines a new equalization vector, the new equalization vector being defined based on the difference between one or more input feature vectors and their respective segmentation vectors. The new equalization vector may then be used either for performing another segmentation iteration on the same observation sequence or for performing segmentation on subsequent feature vectors.

18 Claims, 3 Drawing Sheets

ADAPTIVE DECISION DIRECTED SPEECH RECOGNITION BIAS EQUALIZATION METHOD AND APPARATUS

FIELD OF THE INVENTION

The present invention relates to the field of speech recognition and, in particular, to methods of reducing bias noise in speech recognition systems.

BACKGROUND OF THE INVENTION

Speech recognition is a process by which an unknown speech utterance is identified. Generally, speech recognition is performed by comparing the spectral features of an unknown utterance to the spectral features of known words or word strings.

Spectral features, or simply features, of known words or word strings are determined by a process known as training. Through training, one or more samples of known words or strings are examined and their features recorded as reference patterns, or recognition unit models, in a database of a speech recognizer. Typically, each recognition unit model represents a single known word. However, recognition unit models may represent speech of other lengths such as subwords, such as, for example phones, which are the acoustic manifestation of linguistically-based phonemes. In one type of speech recognizer known as a hidden Markov model (HMM) recognizer, each recognition unit model is represented as an N-state sequence, each state typically comprising a subword unit.

To recognize an unknown utterance, such a speech recognizer extracts features from the utterance to characterize it. The features of the unknown utterance are quantified as multidimensional vector quantities called feature vectors or observation vectors. An observation sequence is comprised of a series of feature vectors. The HMM recognizer then compares the feature vectors of the unknown speech to known spectral features associated with the states in a plurality of candidate HMMs. A scoring technique is used to provide a relative measure of how well each HMM, or state sequence, matches the unknown feature vector sequence. The most likely HMM or state sequence for the observation sequence identifies the utterance. The determination of the most likely state sequence is known as segmentation.

Speech signals provided to such speech recognition systems often encounter variable conditions that significantly degrade the performance of such systems, and in particular, HMM-based speech recognition systems. Undesirable signal components due to channel interference, ambient noise, changes in sound pickup equipment and speaker accent can render the recognizer unsuitable for real-world applications. The above described signal impairments are sometimes referred to as signal bias. The signal bias contaminates the features of the observation sequence, which inhibits pattern matching.

One source of signal bias, channel interference, consists of line noise, such as may be present over a telephone line. Even slight differences in channel interference from time to time can significantly change the spectrum of an analyzed speech signal. The same is true for changes in sound pickup equipment. Different microphones alter an input speech signal in different ways, causing spectral changes. To account for such sources of noise, the speech recognition device may be confined to only one input source, which is impractical for many applications, and will not adequately account for speaker accent or ambient noise.

The noise or signal bias caused by such sources is considered to be additive to the speech signal. A given speech signal, in other words, may be represented as a neutral speech signal plus the signal bias. Various methods have been established to reduce or counteract the bias in speech recognition input signals. One type of noise reduction involves removing an estimate of the signal bias from the speech signal. Systems employing bias removal assume that the noise may be represented as a vector, sometimes called an equalization vector, that is subtracted from each input feature vector in a given observation sequence. Prior art methods of calculating the equalization vector include taking a measurement of the channel signal absent any input speech. Such measurement yields a spectral representation of the channel noise from which the equalization vector is formed. Alternatively, each user may be directed to enter a known lexicon, and then a measured difference between the known lexicon and the spoken utterance is used as the equalization vector. See, for example, S. J. Cox et al., "Unsupervised Speaker Adaptation by Probalialsitic Spectrum Fitting," Pub. CH 2673-2/89/0000-0294 (IEEE 1989).

The latter method provides the most adaptive form of equalization vector because it can estimate for each use the signal bias. However, that method has drawbacks including the requirement for the speaker to train the system, or in other words, speak a known lexicon in every use. Moreover, that method does not account for changes in ambient noise or channel noise over the course of a particular use.

SUMMARY OF THE INVENTION

The present invention provides a speech recognizer that creates and updates the equalization vector as input speech is provided to the recognizer. The recognizer itself determines the equalization vector in an ongoing manner during the segmentation of the input speech.

In particular, in one embodiment, the present invention includes a speech analyzer which transforms an input speech signal into a series of feature vectors or an observation sequence. Each feature vector is then provided to a speech recognizer which modifies the feature vector by subtracting a previously determined equalization vector therefrom. The recognizer then determines a most likely state sequence or hidden Markov model (HMM) that models the input speech. The recognizer further matches the modified feature vector to a stored codebook vector which is called a segmentation vector. The recognizer then, either constantly or periodically, determines a new equalization vector which is based on the difference between one or more input feature vectors and their respective matched segmentation vectors. The new equalization vector may then be used to modify feature vectors in subsequent segmentation operations.

In an embodiment of the present invention for use in a continuous mixture HMM recognizer, the equalization vector is recalculated after a complete segmentation of each observation sequence. First, a most likely state sequence for an observation sequence is determined, and segmentation vectors are determined for each feature vector in the sequence. Then, a new equalization vector is calculated based on the difference between the input feature vectors and their corresponding segmentation vectors. The same series of feature vectors are then re-segmented and the equalization vector is again recalculated. The same sequence of feature vectors may again be re-segmented, and the equalization vector recalculated, several times, each time producing a more accurate segmentation, until a final set of segmentation vectors are provided as an output.

Other features and advantages of the present invention will become readily apparent to those of ordinary skill in the art by reference to the following detailed description and accompanying drawings.

DETAILED DESCRIPTION

Figure 1:
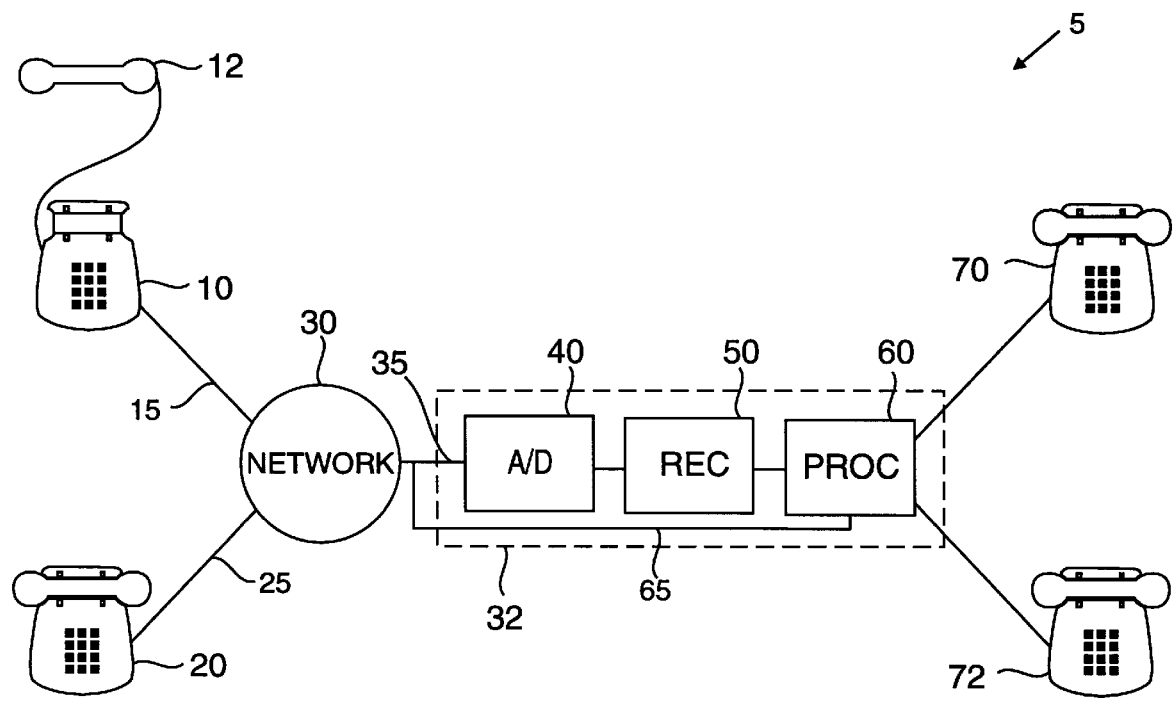
FIG. 1 illustrates a multiple user system including a speech recognition system operating according to the present invention.

FIG. 1 illustrates a communication system 5 in which a speech recognition system 50 operating according the present invention is utilized. The system 5 allows a human operator to control the operation of a remote system 32, such as an automated call routing system, using telephone voice signals. Other possible remote systems include an automated banking system or a retail order processing system. The system 5 includes a first telephone 10 having a corresponding headset 12, a second telephone 20, first and second loop carriers 15 and 25, a telephone network 30, and the remote system 32. The remote system 32 further includes an A/D converter 40, the speech recognition system 50, and a controller 60.

The first and second loop carriers 15 and 25 connect the first and second telephones 10 and 20, respectively, to the network 30. The telephones 10 and 20 may suitably be ordinary subscriber telephone units. The network 30 may include any combination of local service network nodes, long distance carrier nodes, and associated switching offices. An input 35 of the remote system 32 connects the network 30 to the A/D converter 40. A bypass line 65 also connects the input 35 to the controller 60. The speech recognition system 50 is connected between the output of the A/D converter 40 and the controller 60. The speech recognition system 50 contains a trained speech recognizer operating according to the present invention and may suitably comprise the speech recognition system 200 discussed below in connection with FIG. 2.

In the exemplary embodiment illustrated in FIG. 1, the remote system 32 is an automated call routing system for a business office. In this embodiment, the remote system 32 connects incoming telephone calls to a select telephone extension, such as those illustrated as telephone extensions 70 and 72, based on verbal commands of a telephone call originator. For example, a customer calling a business desiring to speak to the extension 72 would establish a connection with the remote system 32 and receive a recorded request for the extension or the name of the employee the customer wishes to contact. When the customer vocally responds with a name or number, the controller 60 automatically connects the incoming caller to the extension requested. To this end, the controller 60 is operable to connect the bypass line 65 to a number of telephone extensions, such as those illustrated by telephone extensions 70 and 72. An exemplary operation of the automated call routing system 32 is provided below.

Initially, a caller using the first telephone 10 establishes a connection with the remote system 32 over the loop carrier 15 and network 30 in a conventional manner, such as picking up the headset 12 and dialing the number he or she wishes to reach. The remote system 32 is connected to the telephone network 30 in a similar manner as any other telephone. Once the connection is established, speech signals may travel in either direction between the telephone 10 and the input 35. The speech signals travelling from the telephone 10 to the input 35 are corrupted or biased by one or more factors, including, but not limited to, noise contributed by the headset 12, the telephone 10, the loop carrier 15, and the network 30. The speech signals may further be corrupted by speaker accent. The combined effects discussed above constitute a bias signal which is additive to the underlying speech signal.

Upon connection, the controller 60 generates a vocal welcome message and a request for an extension or name with which the caller wishes to be connected. The welcome message may be tape-recorded or stored in a digital memory. The speech signals originating at the controller 60 are provided over the bypass line 65 to the network 30 through the input 35. In addition to the request for a name or extension, the controller 60 may suitably provide the user with an option to speak to a human operator in cases where the extension or name is unknown.

If the caller utters a response identifying a particular extension, the speech utterance signal is provided to the A/D converter 40, which converts the utterance to a digital speech signal. The A/D converter 40 provides the digital speech signal to the speech recognition system 50. The speech recognition system 50 operates according to the present invention to remove the bias in the speech signal and perform recognition thereon. The speech signal 50 then preferably provides a data signal representative of the requested extension to the controller 60. The controller 60 connects the bypass line 65 to the appropriate extension in order to establish direct vocal communications between the requested extension and the caller.

If a second caller originates a call from the second telephone 20 and accesses the system 32, the same procedure is performed. In this case, however, the bias signal added to the second caller's speech signal is different from the bias added to the first caller, owing to differences in caller accent, telephone devices, loop carriers, and even the virtual circuit connection within the network 30. In fact, such bias will vary from call to call because of such differences.

According to the present invention, however, the speech recognition system 50 adapts to each caller's bias signal and removes it, producing a modified, more neutral speech pattern signal within the remote system 32. The modified speech patterns may then be matched with universal speech models to perform recognition on the incoming utterances. The speaker is not asked to repeat a standard word or phrase.

The system 5 illustrated in FIG. 1 is given by way of example only, and the present invention is suitable for use in any recognition system subject to sources of time-variable signal bias, including multiple user, multiple input voice recognition systems.

Figure 2:
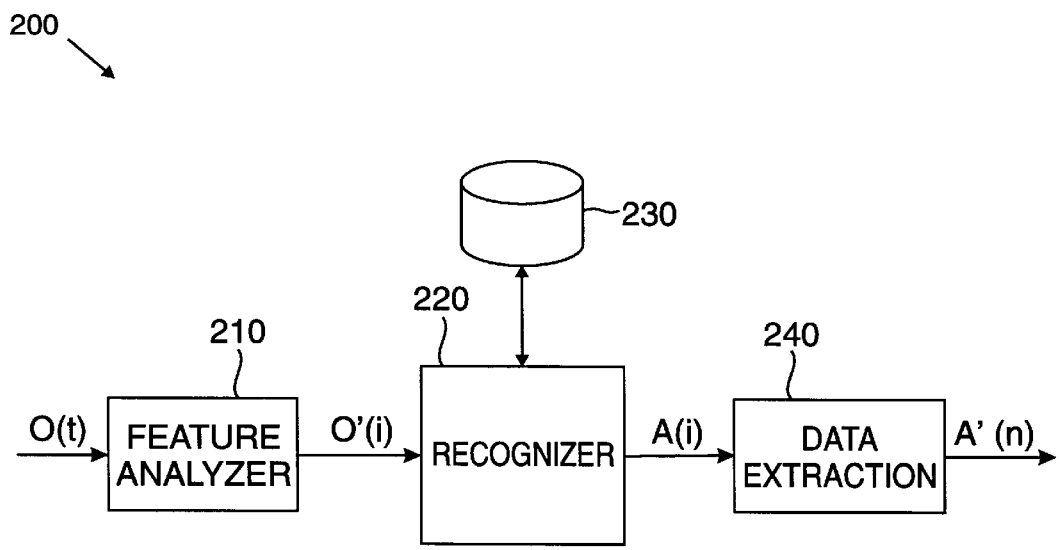
FIG. 2 illustrates a hidden Markov model-based speech recognition system operating according to the present invention.

FIG. 2 illustrates a hidden Markov model-based speech recognition system 200 operating according to the present invention. The system 200 may suitably be used as the speech recognition system 50 shown in FIG. 1. The system 200 includes a feature analyzer 210, a recognizer 220, a data storage device 230, and a data extraction device 240. The system 200 receives input speech signals O(t) which are digital signal representations of spoken utterances, and produces an output data signal A'(n) comprising data representative of the spoken utterances. The system 200 has been trained using known methods and the resulting recognition unit speech models, or model vectors, have been stored in the data storage device 230.

For clarity of discussion, the embodiment illustrated in FIG. 2 is presented as individual functional blocks. The functions these blocks represent may be provided through the use of either shared or dedicated hardware including, but not limited to, hardware capable of executing software. For example, the functions of the blocks 210, 220 and 240 illustrated in FIG. 2 and discussed below may be provided by a single shared processor. Such a processor may comprise an AT&T DSP 16 or DSP 32C and would include read-only memory for storing software for performing the operations discussed below. Other suitable embodiments may readily be implemented by those of ordinary skill in the art.

In the operation of the system 200, the feature analyzer 210 receives input digital speech signals O(t) representative of a spoken utterance from a source of digital speech signals, not shown, which may suitably be an analog to digital converter such as the converter 40 illustrated in FIG. 1. The feature analyzer 210 then converts the signal O(t) to a series of feature vectors or an observation sequence O'(i) for i=1 to N, using well known methods. A feature vector is an m-dimensional vector, wherein the m values represent spectral information pertaining to a particular window of time.

To convert the digital signal to an observation sequence, the feature analyzer 210 first defines a plurality of consecutive temporal windows of the input speech digital signal. The windows typically are less than 50 ms in length and often overlap with adjacent windows to minimize edging effects. Then, for each window of input speech, the feature analyzer 210 performs well known techniques such as linear predictive coding to generate coefficients representative of the spectral characteristics of the windowed speech signal. These coefficients include cepstral coefficients, delta-cepstral coefficients, and log energy coefficients, all of which comprise a portion of the feature vector. The generation of such coefficients is known, and is discussed in L. Rabiner, et al., "Fundamentals of Speech Recognition," at pp. 163, 196–198, Prentice Hall 1993, which is incorporated by reference herein. The feature vectors should conform to the form of the model vectors generated during training. Similar feature vectors are generated for all the defined windows of input speech. In an exemplary embodiment, the feature vectors may suitably comprise the following components:

| | |
|---|---|
| 12 | cepstral coefficients |
| 12 | delta-cepstral coefficients |
| 1 | normalized log energy coefficient | which are discussed, for example, in Rabiner, et al.

The feature analyzer 210 then provides the feature vectors, O'(i) for i=1 to N, to the recognizer 220. The recognizer 220 then performs pattern matching, also known as segmentation, on the feature vectors. Segmentation is the process in which the recognizer 220 determines a most likely state sequence or most likely HMM for the sequence of feature vectors. Each most likely state sequence preferably represents a word model. The recognizer 220 employs a novel segmentation technique that includes adaptive equalization to compensate for signal bias caused by time-varying sources.

To commence the segmentation procedure, the recognizer 220 receives each feature vector and modifies it by subtracting an existing equalization vector therefrom. The equalization vector is a vector that approximates the bias added to the speech signal by channel, microphone and ambient noise, as well as speaker accent. The recognizer then determines a most likely state sequence or HMM using the modified feature vectors. The state sequence is the output of the recognizer, and is determined preferably using well known HMM techniques. The recognizer also selects a segmentation vector A(i) corresponding to each observation vector O'(i). The segmentation vector is a stored model vector that is spectrally similar to the observation vector and is also consistent with the determined state sequence.

The recognizer 220 then, from time to time, calculates the difference between one or more input feature vectors and the corresponding segmentation vectors. These difference calculations yield a raw estimate of the bias for the most recent speech samples. This raw estimate may be scaled and used to update or replace the current equalization vector. Further details regarding the operations of the recognizer 220 are provided in connection with the discussion of FIGS. 3 and 4 below.

In a multi-pass recognizer embodiment, such as the one discussed below in connection with FIG. 3, an entire observation sequence is processed through the recognizer 220 multiple times, and a new equalization vector is calculated after each pass. The recognizer 220 may alternatively employ a one-pass technique, which is discussed below in connection with FIG. 4.

The recognizer 220 then provides the most likely state sequence to the data extraction device 240, which generates data representative of the recognized spoken utterance O(t) as an output. The data extraction device 240 may suitably employ a look-up table or the like to replace the identified word or subword code represented as most likely state sequence with a data signal. For example, a particular sequence of states S1, S2, S3, S4 may represent the word "three". The data extraction device 240 then uses the look-up table to match the most likely state sequence, S1, S2, S3, S4 with the numerical data value "3". Such data may be used by subsequent circuitry to cause a desired action to occur, based on the input speech, such as is the case in the system 5 illustrated in FIG. 1.

Figure 3:
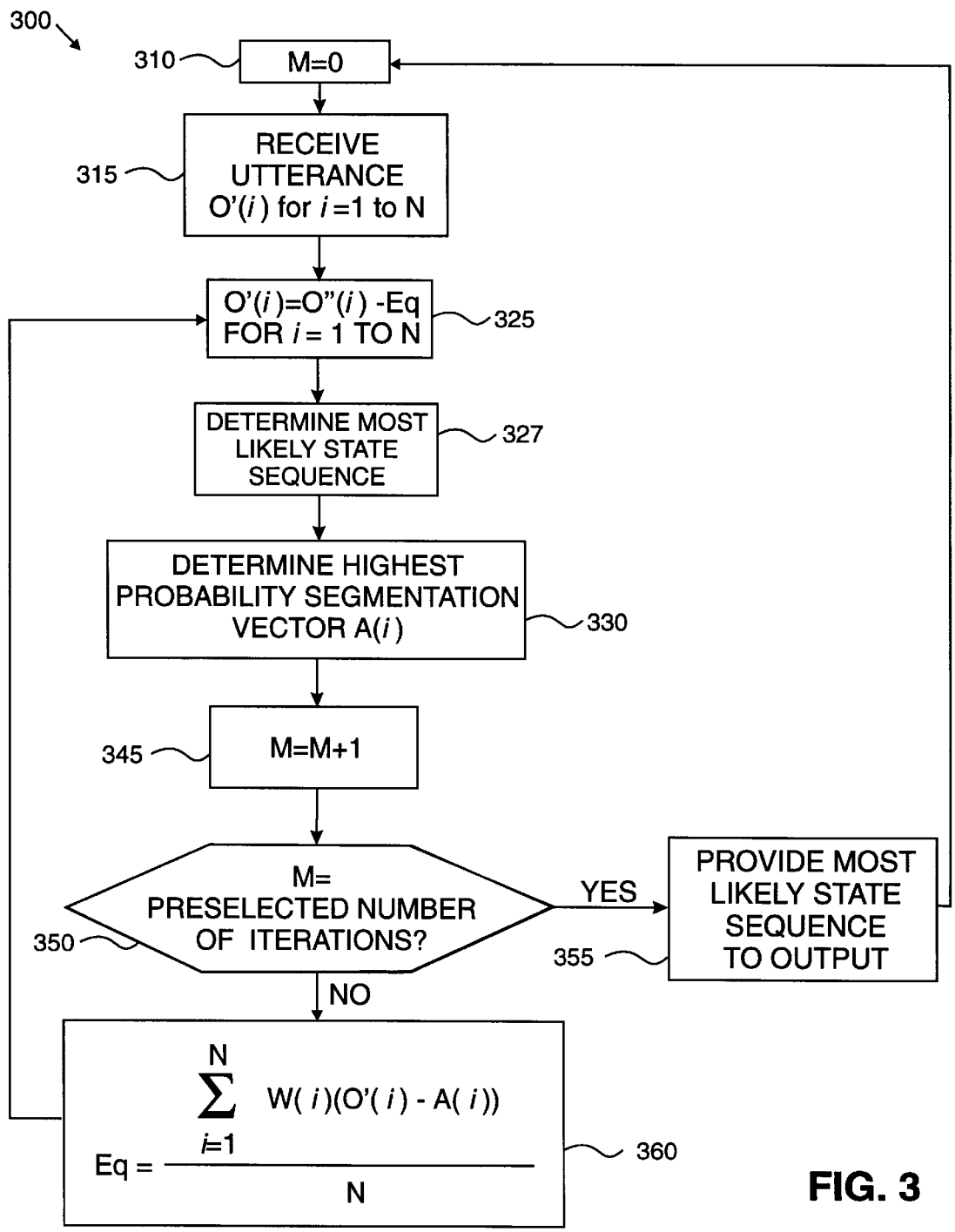
FIG. 3 illustrates a flow diagram of the steps performed by an exemplary embodiment of a speech recognizer for use in the system illustrated in FIG. 2.

FIG. 3 illustrates a flow diagram 300 of the operations of a recognizer, such as the recognizer 220 illustrated in FIG. 2, operating according to the present invention. Prior to performing the operations of the flow diagram 300, the recognizer must be trained according to known methods.

In general, however, HMM recognizers are trained using both first and second order statistics, in other words, spectral means and variances, of known speech samples. In training, a multiple state statistical model, called an HMM, is generated for each recognition unit model. Each state of an HMM is associated with the spectral means and variances and the likelihood of their occurrence in a known word or subword. To this end, each state of an HMM is associated with one or more model vectors, which represent the spectral means derived during training. Each model vector, also called a mixture component, is also associated with a variance component which provides a measure of variation from the mean vector observed during training.

For example, consider a recognition unit model for the word "the". The word "the" may be represented as a two state sequence, S1, S2. The first state S1 corresponds to the "th" portion of the word while the second state S2 corresponds to the "e" portion. For this particular model, the state S2 may be associated with two model vectors, one representative of a long "ee" such as in the word "eat", and one representative of an "ah" sound such as in the word "what". This allows for the different ways in which the word "the" is typically pronounced. In actual circumstances, several model vectors or mixture components may be associated with each particular sound, such as the "th" sound, in order to cover variations in inflection and pronunciation.

Typically, an HMM for a recognition unit model may be characterized by a state transition matrix, A, which provides a statistical description of how new states may be reached from old states, and an observation probability matrix, B, which provides a description of how likely certain model vectors are to be observed in a given state. HMM techniques such as those described above are known. See, for example, Rabiner, et al.

The flow diagram in FIG. 3 represents a segmentation operation of the present invention in a multi-pass, continuous mixture HMM recognizer. In general, the recognizer receives an observation sequence and produces a most likely state sequence. For example, given an observation sequence O'(1), O'(2), O'(3), O'(4), and O'(5), execution of the flow diagram 300 may yield the state sequence S1, S1, S1, S2, S2. The state sequence is then reduced to S1, S2, which indicates that the word "the" was spoken. In this embodiment, the recognizer segments an entire utterance or observation sequence a plurality of times before providing a final most likely state sequence as an output.

In step 310, the variable M is set to 0. The variable M represents the number of passes that the observation sequence has been segmented. Then, in step 315, the recognizer receives an input observation sequence, O'(i) for i=1 to N. The vectors may suitably be stored in a random access memory or the like. The recognizer then executes step 325.

In step 325, each feature vector O(i) in the observation sequence is adjusted by an equalization vector Eq. To perform the adjustment, the vector Eq is subtracted from each feature vector O'(i) to produce a modified feature vector, O"(i). The vector Eq represents an estimate of the bias added by the microphone, channel, speaker accent, or the like. The determination of Eq is discussed below in connection with step 360. For the first pass, however, the vector Eq may suitably be 0. After completion of the adjustment in step 325, the recognizer then executes step 327.

In step 327, dynamic programming techniques are employed to determine a most likely HMM, or state sequence, corresponding to the observation sequence. The most likely state sequence represents the recognized word or subword unit. Typically, several candidate HMMs are considered. As a part of the state sequence determination, each modified feature vector O"(i) is compared to the mixture components associated with one or more states within each candidate HMM. Then, using the probability matrices A and B for each candidate HMM, a most likely HMM or state sequence is selected. Several well known dynamic programming techniques are known that are capable of determining a most likely state sequence or HMM. One example is given by C. H. Lee et al., "A Frame-Synchronous Network Search Algorithm for Connected Word Recognition," IEEE Transactions on Acoustic Speech & Signal Processing 37(ii), pp. 1649–1658 (November 1989), which is incorporated by reference herein.

For example, consider again the example discussed above for the word "the". The modified feature vectors O"(1), O"(2), and O"(3) may each have close spectral similarity to one or more of the mixture components of S1, representing "th". Likewise, vectors O"(4) and O"(5) may have a spectral similarity to the mixture components of S2, representing the sound "ah". If the dynamic programming otherwise determines that the word "the" is appropriate, taking into account syntax and word context, S1, S2 is determined to be the most likely state sequence. In such a case, O"(1), O"(2), and O"(3) are associated with S1, and O"(4) and O"(5) are associated with S2.

After the state sequence is determined, the recognizer executes step 330. In step 330, the recognizer selects a segmentation vector A(i) for each observation vector O"(i). The segmentation vector A(i) is selected from the mixture components associated with the state in the sequence that corresponds to O"(i). Of these mixture components, the selected mixture is the mixture that is spectrally closest to the modified feature vector O"(i). Spectral closeness may suitably be measured by determining the Euclidean distance between the two vectors.

Consider again the example for the word "the". To determine the segmentation vector A(1), all the mixture components of S1 are first compared to the modified feature vector O"(i). The mixture having the shortest Euclidean distance is chosen as the segmentation vector A(1). The segmentation vector A(1) represents an estimate of the vector O'(1) without the effects of bias noise.

Once a segmentation vector A(i) for each modified feature vector O"(i) is selected in step 330, the recognizer proceeds to step 345. In step 345, the recognizer increments the number of iterations or passes, M. Then, in step 350, it is determined whether the recognizer has completed the preselected number of passes. If so, the multi-pass segmentation is complete for the observation sequence and the recognizer proceeds to step 355. The use of as little as two passes is sufficient to provide the benefits of the iterative process. It is noted, however, that the use of a preselected number of passes is given by way of example only. Other suitable stopping criteria may be used.

In step 355, the segmentation state sequence is provided as the recognizer output. The recognizer may then return to step 310 to repeat the process for the next observation sequence.

If, however, in step 350, the answer is no, or in other words, another pass is required, then the processor executes step 360 in which the vector Eq is updated. The vector Eq is preferably updated by averaging the weighted difference between each of the feature vectors O'(i) and their corresponding segmentation vectors A(i). In other words, $$Eq = \frac{\sum_{i=1}^{N} W(i)(O'(i) - A(i))}{N}$$

where W(i) is a weighting factor that is preferably based on the confidence level that A(i) is the proper segmentation vector with respect to O'(i). This confidence level W(i) may suitably depend on the statistical variance measure for vector A(i) within the state associated with O'(i). For example, if the chosen mixture has large variance in state S1, W(i) will be larger. If, however, the chosen mixture exhibits little variance, W(i) may be smaller. Various measures of such a confidence level are generated during the most likely state sequence determination of step 327.

In the alternative, the vector Eq may be updated using other suitable equations. For example, the new Eq vector may be a modification of the existing Eq vector, as given by $$Eq = Eq_{old} + \frac{\sum_{i=0}^{N}(O'(i) - A(i))}{N}$$

in which $Eq_{old}$ is the existing Eq vector. Those of ordinary skill in the art may readily implement other variations of the Eq calculation based upon the differences between the feature vectors and their corresponding segmentation vectors. For example, a histogram of similar difference vectors may be stored and Eq may be set equal to the difference vector with the highest repetition history. In any event, the resulting vector Eq approximates the bias in the speech signal by representing the bias as an added vector to otherwise neutral or universal speech patterns.

After the vector Eq is redefined in step 360, the recognizer returns to step 325 to perform another pass or iteration of segmentation of the observation sequence.

In execution of the flow diagram 300, the observation sequence is segmented for M passes or iterations or until some other stopping criteria is met. In every iteration, Eq is updated, becoming more refined, and thus improving the segmentation of the feature vectors. The present invention thus provides an iterative process to determine a vector that approximates the bias present in the input signal. The method of the present invention recalculates or refines the bias estimate Eq on an ongoing basis, which compensates for changing characteristics in line and ambient noise, as well as use-to-use changes in bias.

Figure 4:
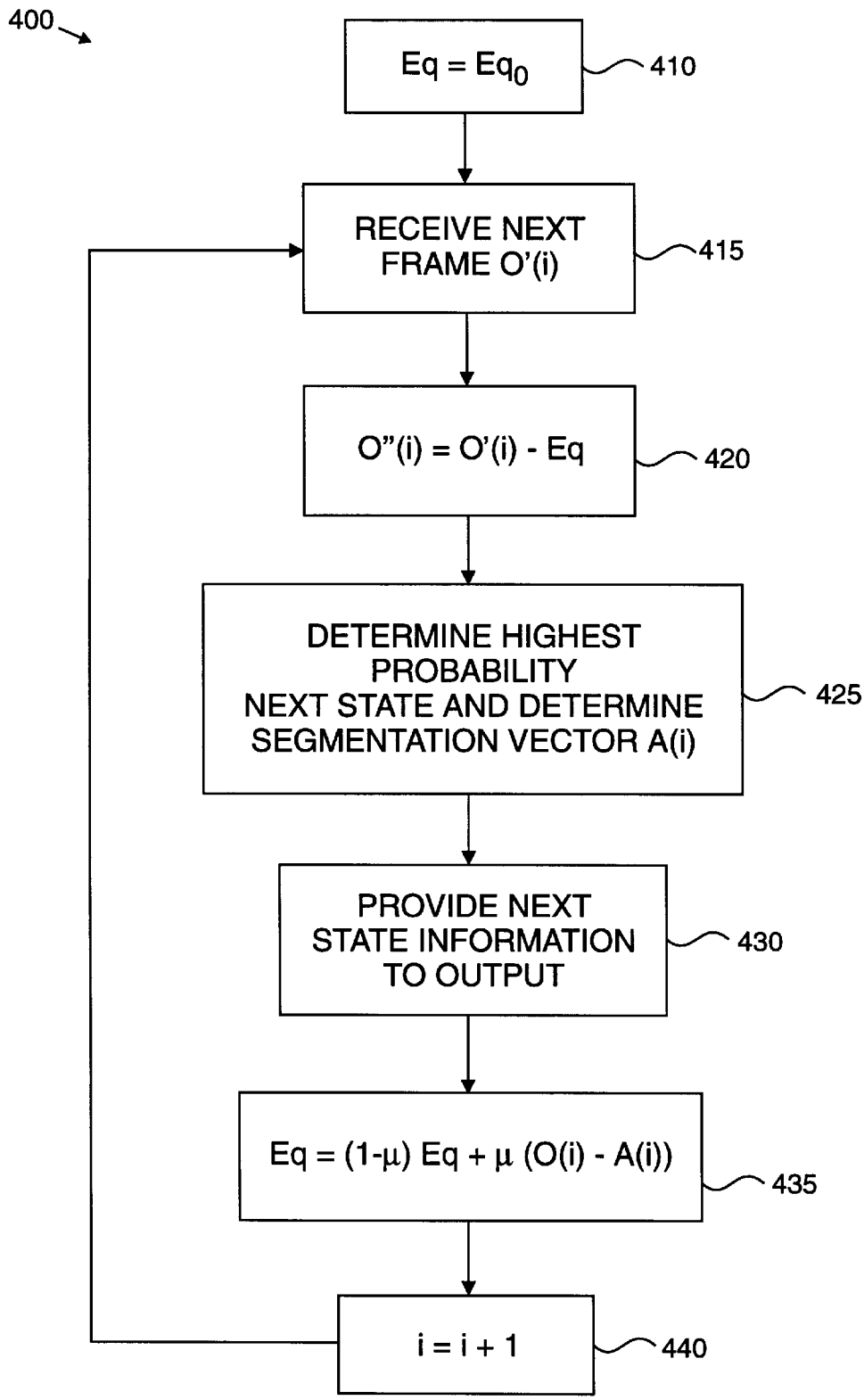
FIG. 4 illustrates a flow diagram of the steps performed by an alternative embodiment of a speech recognizer for use in the system illustrated in FIG. 2.

FIG. 4 shows an alternative flow diagram for use in a recognizer such as the recognizer 220 illustrated in FIG. 2. The flow diagram in FIG. 4 represents an implementation of the present invention in a one pass recognition embodiment. In a one pass recognition system, the feature vectors are only segmented once, as opposed to the multiple-pass system illustrated in FIG. 3. In comparison to the multi-pass system, the one pass system typically will generate more recognition errors because of the lack of the multi-pass segmentation refinement. On the other hand, the one pass system requires far less computation time. Those of ordinary skill in the art may determine which implementation suits a particular design requirement.

Step 410 is an initialization step that preferably occurs only when a new recognition transaction, such as a new telephone call, is initiated. In step 410, the recognizer first resets the vector Eq equal to an initial vector, $Eq_0$, which may be zero or a prior stored estimate of the bias. After initialization in step 410, the recognizer proceeds to step 415 which is the beginning of the ongoing one pass segmentation process.

In step 415, the recognizer receives the next feature vector O'(i). Then, in step 420, the feature vector is adjusted by the equalization vector Eq. The adjustment is accomplished by subtracting the vector Eq from the vector O'(i), which produces a modified vector O"(i). After the adjustment in step 420, the recognizer executes step 425.

In step 425, the recognizer uses well known HMM dynamic programming techniques to match the modified feature vector O"(i) to both a next state in a most likely state sequence and the closest model vector associated that next state. The closest model vector then becomes the segmentation vector A(i). Step 425 may suitably employ similar HMM techniques as in step 327 discussed above in connection with FIG. 3. The recognizer then executes step 430.

In step 430, the recognizer provides the most likely next state to the recognizer output. Thereafter, in step 435, the recognizer recalculates the equalization vector Eq. To this end, the current Eq is modified by the difference between the current feature vector O'(i) and its segmentation vector A(i). In particular, the modification of the equalization vector is given by:

$$Eq=(1-\mu)Eq+\mu(O'(i)-A(i))$$

where $\mu$ is a positive scalar value of less than 1 and preferably less than 0.1. The recognizer then proceeds to step 440 in which the index i is increased. After the index is increased in step 440, the recognizer returns to step 415 to segment the next feature vector.

The above flow chart thus both adjusts the input feature vectors by Eq to reduce bias noise and recalculates the Eq value based on the old Eq and the difference between the input feature vector and the segmentation vector.

It is to be understood that the above-described embodiments of the invention are merely illustrative. Other implementations may readily be devised by those skilled in the art which will embody the principles of the invention and fall within the spirit and scope thereof. For example, a speech recognizer operating according to the present invention may be used to control systems other than the one illustrated in FIG. 1, including voice-activated consumer electronic devices and appliances. To this end, the telephone headsets may be replaced by other suitable speech input devices and no telephone network would be required.

We claim:

1. An apparatus for recognizing in real time speech signals produced under changing ambient conditions by a plurality of speakers, the apparatus comprising:
    a speech analyzer operable to generate a plurality of feature vectors from an input speech signal;
    a memory device containing speech model vectors; and
    a speech recognizer operably connected to receive speech model vectors from the memory device, said speech recognizer operable to:
        a) receive an observation sequence comprising a plurality of feature vectors from the speech analyzer;
        b) modify at least one feature vector using an equalization vector determined in an ongoing manner;
        c) generate a segmentation vector corresponding to the modified feature vector using the speech model vectors;
        d) generate a subsequent equalization vector based upon the difference between the segmentation vector and the corresponding feature vectors; and
        e) remove signal bias including bias caused by ambient noise.

2. The apparatus of claim 1 wherein the recognizer is further operable to:
    perform the operations of b) and c) for the plurality of feature vectors before performing the operation of d), and
    wherein the recognizer is further operable to generate a subsequent equalization vector based upon the weighted average difference between the plurality of feature vectors and the plurality corresponding of segmentation vectors.

3. The apparatus of claim 2 wherein the recognizer is further operable to:
    e) modify at least one feature vector using the subsequent equalization vector; and
    f) generate a subsequent segmentation vector corresponding to the modified feature vector using the speech model vectors.

4. The apparatus of claim 3 wherein the recognizer comprises a hidden Markov model speech recognizer.

5. The apparatus of claim 1 wherein the recognizer comprises a hidden Markov model speech recognizer.

6. The apparatus of claim 1 wherein the recognizer is further operable to generate a subsequent equalization vector based upon the vector sum of the equalization vector and the difference between the feature vector and the corresponding segmentation vector, said difference being adjusted by a scaling factor.

7. The apparatus of claim 1 wherein the recognizer is further operable to generate a most likely state sequence corresponding to the observation sequence.

8. A method of processing input speech signals produced under changing ambient conditions by a plurality of speakers comprising:
   a) generating a plurality of feature vectors from an input speech signal;
   b) providing at least one feature vector to a speech recognizer;
   c) employing the speech recognizer to modify at least one feature vector using an equalization vector determined in an ongoing manner;
   d) employing dynamic programming to determine at least one state of a most likely state sequence based on at least one modified feature vector;
   e) employing the speech recognizer to generate at least one segmentation vector from at least one modified feature vector using a plurality of speech model vectors; and
   f) generating a subsequent equalization vector based upon the difference between at least one segmentation vector and at least one corresponding feature vector.

9. The method of claim 8 wherein step d) further comprises determining at least one state based on a spectral similarity between at least one modified feature vector and at least one speech model vector.

10. The method of claim 8 further comprising the step of repeating steps b), c) and e) for a plurality of feature vectors before executing step f), and
   wherein step f) further comprises generating a subsequent equalization vector based upon the average difference between the plurality of feature vectors and the corresponding plurality of segmentation vectors.

11. The method of claim 10 further comprising the steps of:
   g) employing the speech recognizer to modify the plurality of feature vectors using the subsequent equalization vector; and
   h) employing dynamic programming to determine at least one state of a subsequent most likely state sequence based on at least one modified feature vector.

12. The method of claim 8 wherein the speech recognizer comprises a hidden Markov model speech recognizer.

13. The method of claim 8 wherein step d) further comprises generating a subsequent equalization vector based upon the vector sum of the equalization vector and the difference between the feature vector and the segmentation vector, said difference being adjusted by a scaling factor.

14. An apparatus for providing voice control of a system, the apparatus comprising:
   a speech input device operable to receive input speech from a plurality of users where said input speech is produced under changing ambient conditions and generate speech signals;
   a speech analyzer connected to receive speech signals from the speech input device and generate feature vectors representative of the speech signals;
   a speech recognizer connected to receive feature vectors from the speech analyzer, said speech recognizer operable to
      modify each feature vector using an equalization vector determined in an ongoing manner;
      generate a most likely state sequence corresponding to the modified feature vectors;
      generate a segmentation vector for at least one modified feature vector;
      generate a subsequent equalization vector based upon the difference between one or more segmentation vectors and their respective feature vectors; and
   a data extraction device operable to receive segmentation vectors from the speech recognizer and produce control data therefrom, said control data being usable by a controller in the system.

15. The apparatus of claim 14 further comprising a controller operable to receive the control data from the data extraction device and further operable to control the system based upon the input speech.

16. The apparatus of claim 15 wherein the controller is connected to a plurality of telephone extensions and the controller is operable to connect the speech input device to a voice-selected telephone extension.

17. The apparatus of claim 14 wherein the speech input device includes a telephone.

18. The apparatus of claim 14 further comprising a plurality of speech input devices, each speech input device operably connected to provide input speech signals to the speech analyzer.

* * * * *